(12) United States Patent
Zhang et al.

(10) Patent No.: US 11,596,933 B2
(45) Date of Patent: Mar. 7, 2023

(54) CATALYST CAPABLE OF SIMULTANEOUSLY REMOVING COS AND H2S IN GARBAGE GASIFICATION AND PREPARATION METHOD THEREOF

(71) Applicant: QINGDAO UNIVERSITY OF TECHNOLOGY, Shandong (CN)

(72) Inventors: Huawei Zhang, Shandong (CN); Mingzhu Zhang, Shandong (CN); Peng Liang, Shandong (CN); Dong Chen, Shandong (CN); Tiantian Jiao, Shandong (CN); Yaqing Zhang, Shandong (CN)

(73) Assignee: QINGDAO UNIVERSITY OF TECHNOLOGY, Shandong (CN)

( * ) Notice: Subject to any disclaimer, the term of this patent is extended or adjusted under 35 U.S.C. 154(b) by 0 days.

(21) Appl. No.: 17/427,561

(22) PCT Filed: Jun. 3, 2020

(86) PCT No.: PCT/CN2020/094242
§ 371 (c)(1),
(2) Date: Jan. 11, 2022

(87) PCT Pub. No.: WO2021/169079
PCT Pub. Date: Sep. 2, 2021

(65) Prior Publication Data
US 2022/0387982 A1  Dec. 8, 2022

(30) Foreign Application Priority Data
Feb. 27, 2020 (CN) .......................... 202010125253.7

(51) Int. Cl.
*B01J 29/78* (2006.01)
*B01J 37/02* (2006.01)
*B01J 37/08* (2006.01)
*B01J 37/06* (2006.01)
*B01D 53/86* (2006.01)

(52) U.S. Cl.
CPC .......... *B01J 29/78* (2013.01); *B01D 53/8612* (2013.01); *B01D 53/8668* (2013.01); *B01J 37/0207* (2013.01); *B01J 37/0213* (2013.01); *B01J 37/0236* (2013.01); *B01J 37/06* (2013.01); *B01J 37/088* (2013.01); *B01D 2255/2073* (2013.01); *B01D 2255/2094* (2013.01); *B01D 2255/50* (2013.01); *B01D 2257/304* (2013.01); *B01D 2257/306* (2013.01)

(58) Field of Classification Search
CPC ............. B01D 53/8612; B01D 53/8668; B01J 37/0207; B01J 37/0213; B01J 37/0236; B01J 37/06; B01J 37/088; B01J 29/78
See application file for complete search history.

(56) References Cited

FOREIGN PATENT DOCUMENTS

| | | | |
|---|---|---|---|
| CN | 103990489 A | 8/2014 | |
| CN | 104383874 A | 3/2015 | |
| CN | 104415657 A | 3/2015 | |
| CN | 106102901 A | 11/2016 | |
| CN | 106890660 A | 6/2017 | |
| CN | 109772427 A | 5/2019 | |
| CN | 110627086 A | * 12/2019 | ............. B01J 20/18 |
| CN | 110627086 A | 12/2019 | |
| CN | 111215123 A | 6/2020 | |
| WO | 2008127602 A2 | 10/2008 | |

* cited by examiner

*Primary Examiner* — Yong L Chu
(74) *Attorney, Agent, or Firm* — Birch, Stewart, Kolasch & Birch, LLP

(57) ABSTRACT

The disclosure discloses a catalyst capable of simultaneously removing COS and $H_2S$ in garbage gasification and a preparation method thereof, and belongs to the technical field of preparation of desulfurization catalysts. The method includes the following steps: pretreating an SBA-15 molecular sieve with a templating agent unremoved, which primarily includes the steps of removing the templating agent and introducing halogen atoms to modify the molecular sieve; then synthesizing an active component solution; and finally introducing active components into channels of the pretreated molecular sieve via surface tension by adopting an impregnation method, performing washing and drying, and performing calcining under an $N_2$ atmosphere, so as to obtain the catalyst. The catalyst prepared according to the present disclosure can load the active components in fixed positions inside and outside the channels, and the components are easy to obtain, thereby having the advantages of low cost and good desulfurization effects.

8 Claims, 1 Drawing Sheet

CATALYST CAPABLE OF SIMULTANEOUSLY REMOVING COS AND H2S IN GARBAGE GASIFICATION AND PREPARATION METHOD THEREOF

This application is a National Phase Application of PCT Application No. PCT/CN2020/094242 filed Jun. 3, 2020 which claims the priority of Chinese Application No. 202010125253.7 filed on Feb. 27, 2020, entitled "CATALYST CAPABLE OF SIMULTANEOUSLY REMOVING COS AND H2S IN GARBAGE GASIFICATION AND PREPARATION METHOD THEREOF", which is incorporated herein by reference in its entirety.

TECHNICAL FIELD

The present disclosure relates to the technical field of preparation of desulfurization catalysts, in particular to a catalyst for removing COS and $H_2S$ in garbage gasification and a preparation method thereof.

BACKGROUND

Nowadays, "garbage siege" has become one of important factors restricting development of many regions and affecting the living quality of people. Household garbage not only occupies a lot of lands, but also causes continuous pollution to the environment on which human beings depend, thereby posing a threat to the health of human beings. Garbage gasification is a gasification reaction after household garbage subjected to pre-treatment such as crushing and drying enters a gasification furnace, and combustible gas generated by gasification is fed into a hearth of a coal-fired boiler to combust after the temperature of the combustible gas is reduced to about 400° C. A lot of toxic substances will be further generated in the garbage gasification process, wherein sulfur-containing compounds include inorganic sulfur ($H_2S$) and organic sulfur (COS and the like). Thus, in order to reduce pollution of the sulfur-containing compounds generated in the garbage gasification process to the environment, researchers have made related researches. There are primary research reports as follows:

A patent with the application number 201910459266.5 discloses a desulfurization catalyst and a preparation method and an application thereof. Active substances include iron sesquioxide, cobalt oxide, molybdenum oxide and zinc oxide, wherein the mass ratio of Fe to Co to Mo is (1-5):(1-4):(1-5.5). A carrier is carbon, preferable activated carbon. Zinc is added in an amount so that zinc accounts for 1-20 wt % in the desulfurization catalyst. The desulfurization catalyst is researched to simultaneously remove various sulfides in a gas source based on carbon, and can remove carbonyl sulfide, mercaptan and hydrogen sulfide in the gas source integrally in a same process condition. The desulfurization catalyst can be used for desulfurizing and purifying sulfur-containing tail gas effectively, and the desulfurization efficiency reaches 98.5%. However, the catalyst takes activated carbon as the carrier, a pore diameter structure is a micropore structure, and carbonyl sulfide and hydrogen sulfide are catalytically oxidized in one step into elemental sulfur which will block channels when being loaded onto the surface of the catalyst to lead to a limited service life of the catalyst.

A patent with the application number 201210208285.9 discloses a detergent for adsorbing hydrogen sulfide and carbonyl sulfide in tail gas of natural gas. The detergent takes activated carbon as a carrier and a soluble zinc salt and a soluble copper salt as active components. The detergent is prepared by the following steps: first, preparing an aqueous solution from the active components zinc salt and copper salt; then mixing the active component solution with an activated carbon solution, and stirring the obtained mixture in a room temperature condition to obtain a solution loading an active metal carrier; then drying the solution loading the active metal carrier to obtain particles loading the active metal carrier; and finally, oxidizing the particles loading the active metal carrier, and washing and drying the oxidized particles to obtain a finished product detergent. However, as the active components of the detergent are the soluble zinc salt (zinc nitrate or zinc acetate), the active components of the detergent dissolved in water are acidic, so that the active components are easily lost when being loaded onto the carrier. Hydrogen sulfide and carbonyl sulfide in the tail gas of the natural gas are adsorbed at a not high temperature which is usually a normal temperature and the garbage gasification temperature is very high and can reach 300-400° C. If hydrogen sulfide and carbonyl sulfide at normal temperature are removed, a gas cooling apparatus shall be additionally arranged, such that the investment of the apparatus is large and the cost is high. If the detergent is directly used to remove hydrogen sulfide and carbonyl sulfide, the active components are easily deactivated, such that an expected desulfurization effect cannot be achieved.

A patent with the application number 201410856116.5 discloses a desulfurizer capable of removing hydrogen sulfide and carbonyl sulfide simultaneously. The desulfurizer is prepared from the following steps: mixing and kneading a zinc-containing compound, a binder and an accelerant for forming; drying the mixed and kneaded formed mixture to obtain a dried desulfurizing carrier precursor; roasting the obtained desulfurizing carrier precursor to obtain a desulfurizer carrier; impregnating the desulfurizer carrier with a first copper salt solution to load the copper active component to the desulfurizer carrier, wherein the first copper salt solution is an ammonia water solution of basic cupric carbonate; and drying and roasting the obtained impregnated sample to obtain the desulfurizer capable of removing hydrogen sulfide and carbonyl sulfide simultaneously. However, in the carrier mixing and kneading formation, problems that the contact areas between the toxic substances and the active components are small, loading is non-uniform and the channels are easily blocked and the like exist.

In conclusion, catalysts in the prior art cannot remove COS and $H_2S$ generated in the garbage gasification tail gas efficiently due to problems that the active components are easily lost, the channels are easily blocked and the like.

SUMMARY

In order to solve the technical problems that the active components are easily deactivated and the channels of the catalyst are easily blocked as the active components are easily lost in the prior art, the present disclosure provides a catalyst capable of simultaneously removing COS and $H_2S$ in garbage gasification and a preparation method thereof. The catalyst takes a mesoporous molecular sieve as a carrier, the carrier has a two-dimensional hexagonal structure and is large in pore diameter, channels are interconnected, and after active components are introduced, the channels can be prevented from being blocked. The catalyst prepared by the method is good in desulfurization efficiency.

One of tasks of the present disclosure is to provide a preparation method of a catalyst capable of simultaneously removing COS and H₂S in garbage gasification, successively including the following steps:

S1, taking a mesoporous molecular sieve SBA-15 as a carrier and pretreating the mesoporous molecular sieve SBA-15:

dissolving the mesoporous molecular sieve SBA-15 in ethanol to be subjected to reflux in a water bath, performing washing and drying, dissolving the dried product in normal hexane, performing ultrasonic dispersion, dropwise adding a modifier to introduce halogen atoms to modify an outer surface of the mesoporous molecular sieve SBA-15, performing ultrasonic dispersion for a period of time, moving the ultrasonically treated mesoporous molecular sieve SBA-15 into a container for refluxing, and performing filtering, washing and drying to obtain the pretreated mesoporous molecular sieve SBA-15;

S2, preparing an active component solution, wherein the active component solution is one of an MnSn solution, a FeSn solution or a ZnSn solution;

S3, uniformly mixing the mesoporous molecular sieve SBA-15 pretreated in the step S1 with the active component solution, and putting the mixture in a magnetic stirrer to be stirred at a uniform speed for a period of time, allowing the stirred mixture to stand, and performing drying; and S4, roasting the solid obtained by drying in the step S3 at a temperature of 450-550° C. for 4-6 hours, then naturally cooling the roasted solid to room temperature after roasting is finished, performing grinding and drying, and performing calcining under a N₂ atmosphere to obtain the catalyst.

In the technical solution, on one hand, the mesoporous molecular sieve SBA-15 as the carrier is the two-dimensional hexagonal structure, and is large in pore diameter, the channels are interconnected, and after the active components are introduced, the channels can be prevented from being blocked. However, it is a technical problem of loading the active components directly into the mesoporous molecular sieve and the active components cannot be loaded directly without treating the mesoporous molecular sieve. Therefore, in the present disclosure, a templating agent for the mesoporous molecular sieve SBA-15 is removed first, halogen atoms are then introduced into the mesoporous molecular sieve with the templating agent removed for modification, and the active components enter into the channels of the molecular sieve via surface tension. As the bond energy between silicon and the halogen atoms is weak, it is easier to interact with the active components, such that the active components can be loaded to fixed positions of SBA-15.

In the solution, selection and pre-treatment of the mesoporous molecular sieve SBA-15 as a whole is a necessary and sufficient condition for loading the component actives subsequently. The catalyst prepared by uniformly mixing the mesoporous molecular sieve modified by the halogen atoms and the active component solution, and performing drying and calcining has a better efficiency of removing COS and H₂S simultaneously within a wide temperature range.

Further, in the step S1, the modifier is one of chloromethyltrimethylsilane, tert-butyl bromoacetate or hydroiodic acid, wherein chlorine atoms are introduced by chloromethyltrimethylsilane, bromine atoms are introduced by tert-butyl bromoacetate and iodine atoms are introduced by hydroiodic acid.

Further preferably, the modifier is chloromethyltrimethylsilane.

Further preferably, the active component solution in the step S2 is the MnSn solution.

Further, the MnSn solution is prepared by the following steps: weighing 2.5 g of a 50% $Mn(NO_3)_2$ solution and preparing a 50 mL solution in a beaker; weighing 1.02 g of $SnCl_4 \cdot 5H_2O$, and preparing a 50 mL solution in a beaker; and uniformly mixing the two solutions well to obtain the MnSn solution.

Further, in the step S1, the mesoporous molecular sieve SBA-15 is dissolved in ethanol, the water bath temperature is set at 60-80° C., the reflux time is 10-13 hours, and the templating agent for the mesoporous molecular sieve SBA-15 is removed by washing and drying; and the mass-volume ratio of the mesoporous molecular sieve SBA-15 to ethanol is 1:20 g/mL.

Further, in the step S3, the mixture is stirred for 10-14 hours, is allowed to stand for 10-14 hours, and is dried in an oven at a temperature of 70-90° C.

Further, the calcining temperature is 450-550° C.

Further, in the step S1, the dried product is dissolved in normal hexane, ultrasonic treatment is performed for 20-30 min, the modifier chloromethyltrimethylsilane are added dropwise, and ultrasonic treatment is continued to be performed for 20-40 min.

Another task of the present disclosure is to provide a catalyst capable of simultaneously removing COS and H₂S in garbage gasification prepared by the preparation method.

In the catalyst, manganese and tin account for 5-20 wt % and 5-15 wt % of the mass of the catalyst respectively.

The main reaction principle of the catalyst of the present disclosure is as follows:

First, pretreating an SBA-15 molecular sieve with a templating agent unremoved, performing refluxing on the SBA-15 molecular sieve in ethanol in a water bath at 60-80° C. for 10-13 hours, repeating twice and washing and drying to remove the templating agent for the molecular sieve without destroying hydroxyl on the surface of the molecular sieve, and then activating and modifying inner and outer surfaces of the molecular sieve to introduce halogen atoms; then dispersing the active substances to the SBA-15 molecular sieve uniformly, preferably, dispersing manganese and tin to the SBA-15 molecular sieve uniformly, specifically including the steps: first, mixing a manganese-containing solution and a tin-containing solution uniformly, then adding the pre-treated molecular sieve, performing stirring for 10-14 hours at room temperature to prevent the active substances from being clustered to the molecular sieve, allowing the stirred material to stand for 10-14 hours and putting a mixed solution in an oven to be dried to make sure that the active substances are dispersed inside and outside the molecular sieve without a waste phenomenon; and finally, turning the active components loaded to the molecular sieve to oxides, specially including the step: calcining a dried solid under an N₂ atmosphere at 450-550° C. for about 2 hours so that manganese and tin are turned to manganese dioxide and tin oxide.

Compared with the prior art, the present disclosure has the following beneficial effects:

(1) The catalyst taking the mesoporous molecular sieve SBA-15 as the carrier prepared by the method provided by the disclosure shows unique characteristics physically and chemically so that the desulfurization efficiency can reach up to 100%.

(2) The mesoporous material has the characteristics of large pore diameter, large specific surface area and large pore volume, and rich silicon hydroxyl exists on inner and outer surfaces of the channels. Good active sites are provided for surface modification of the mesoporous material in the presence of silicon hydroxyl. According to the present disclosure, the outer surface of the SBA-15 is modified by the halogen atoms. The active components enter into the channels of the molecular sieve via surface tension. As the bond energy between silicon and the halogen atoms is weak, it is easier to interact with the active components, such that the active components can be loaded to fixed positions of the SBA-15. The metal oxides as the active components are wide in source of metals and low in price, and the method of converting the oxides is simple. The method of the present disclosure is simple, and is not high in demand on apparatus and the catalyst can be produced industrially.

(3) The beneficial technical effects of the present disclosure can be further reflected by the embodiments below; the embodiments research influence of the active components on different molecular sieves on COS and $H_2S$ removal efficiency; and researches show that when manganese and lanthanum oxides are loaded inside and outside the SBA-15 molecular sieve, the catalyst is optimum in desulfurization efficiency.

BRIEF DESCRIPTION OF THE DRAWINGS

Further description of the present disclosure will be made below in combination with drawings.

DETAILED DESCRIPTION

First, a related detection method of the present disclosure is described below:

A method of evaluating activity of the catalyst of the present disclosure is as follows:

A detection method adopts a fixed bed reactor, a gas chromatograph and a flame photometric detector.

Steps for Detecting Activity of an Adsorbent:

putting the prepared $MnSnO_x$/SBA-15 catalyst in a tubular furnace of the fixed bed reactor; controlling flows of COS, $H_2S$, $H_2O$ and $N_2$ at an air inlet by a mass flowmeter; and detecting concentrations of $H_2S$ and COS at an outlet by using 9790 II gas chromatograph (SP-9790II) and the flame photometric detector (GC-FPD).

Evaluation method: the desulfurization efficiency can be obtained by means of change of concentrations of $H_2S$ in flue gas before and after. A calculating method is as shown by a formula:

$$\text{desulfurization efficiency} = \frac{C_{in} - C_{out}}{C_{in}} \times 100\%$$

wherein $C_{in}$ is the concentrations of $H_2S$ and COS at the inlet and $C_{out}$ is the concentrations of $H_2S$ and COS at the outlet.

Further description of the present disclosure will be made below in combination with specific embodiments:

Embodiment 1

S1, pre-treatment on an SBA-15 molecular sieve with a templating agent unremoved: first, the SBA-15 molecular sieve is dissolved in ethanol to be subjected to reflux, the refluxed SBA-15 molecular sieve is washed and dried, the above operations are repeated twice, then the dried product is dissolved in normal hexane and is dispersed ultrasonically, chloromethyltrimethylsilane is dropwise added, and ultrasonic treatment is continued to be performed for 20-40 minutes; and finally, the treated SBA-15 molecular sieve is transferred into a water bath pot to be subjected to reflux for 10-13 hours, and the refluxed SBA-15 molecular sieve is filtered, washed and dried for subsequent experimental use;

S2, pre-treatment on the active component material: 2.5 g of a 50% $Mn(NO_3)_2$ solution is weighed and a 50 mL solution is prepared in a beaker; 1.02 g of $SnCl_4 \cdot 5H_2O$ is weighed, and a 50 mL solution is prepared in a beaker; and the two solutions are uniformly mixed well to obtain an MnSn solution;

S3, 5 g of the treated SBA-15 molecular sieve is weighed and is added into the beaker containing the MnSn solution to be mixed well uniformly;

S4, the mixed solution is put in a magnetic stirrer, is stirred at a uniform speed for 10-14 hours at room temperature, is allowed to stand overnight and is then put in an oven of 70-90° C. to be dried; and S5, the dried solid is roasted at a temperature about 450-550° C. for 4-6 hours so that manganese and tin are turned into manganese dioxide and tin oxide, the roasted solid is naturally cooled to room temperature after roasting is finished, and the cooled material is ground to about 80-100-mesh and is transferred to a vacuum drying box to obtain an $MnSnO_x$/SBA-15 catalyst.

Figure 1:
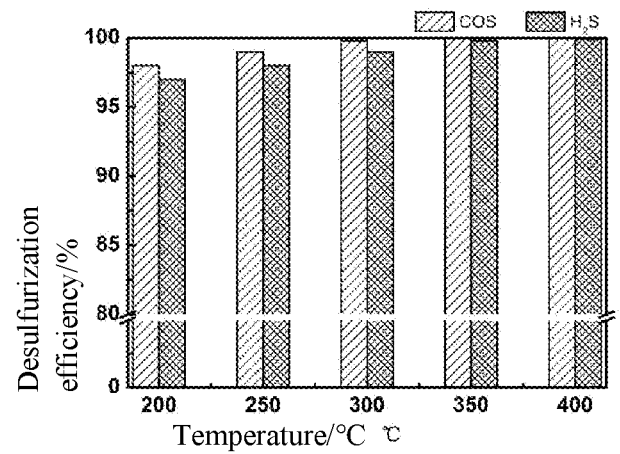
FIG. 1 is a diagram of desulfurization efficiency of an $MnSnO_x$/SBA-15 catalyst prepared in Embodiment 1 of the present disclosure.
Figure 2:
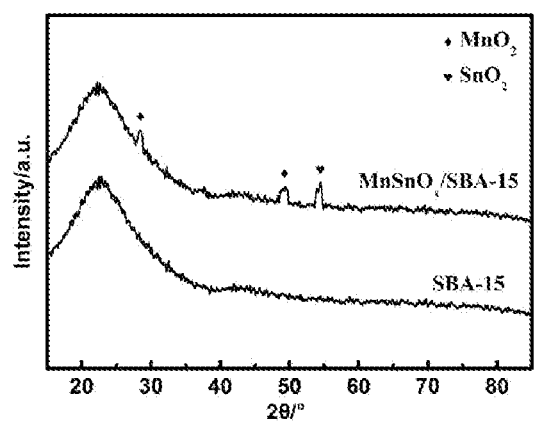
FIG. 2 is XRD diffraction patterns of the SBA-15 molecular sieve and the finally prepared $MnSnO_x$/SBA-15 catalyst in Embodiment 1 of the present disclosure.

An experiment is performed on the $MnSnO_x$/SBA-15 catalyst prepared in this embodiment at a temperature of 200-400° C. and an experimental result shows that the desulfurization efficiency is approximate to 100% at 350° C., shown in the FIG. 1. The XRD diffraction patterns of the SBA-15 molecular sieve and the finally prepared $MnSnO_x$/SBA-15 catalyst are as shown in the FIG. 2. By comparing two curves, it is found that small diffraction peaks on $MnSnO_x$/SBA-15 are diffraction peaks of manganese oxide and tin oxide.

Embodiment 2

Different from Embodiment 1, the mixed solution in the step S2 is a FeSn solution (the steps of preparing the FeSn solution are with reference to the prior art).

A desulfurization experiment is performed by selecting simulated garbage gasification gas, wherein the simulated garbage gasification gas contains 0.2% of COS, 2.4% of $H_2S$ and the balance $H_2O$ and $N_2$. The desulfurization experiment is performed with the COS introduction flow of 0.2 mL/min, the $H_2S$ introduction flow of 2.4 mL/min and carrier gas $H_2O$ and $N_2$ flow of 97.4 mL/min. An experimental result shows that the desulfurization efficiency is 94% at 350° C.

Embodiment 3

Different from Embodiment 1, the mixed solution in the step S2 is a ZnSn solution (the steps of preparing the ZnSn solution are with reference to the prior art).

A desulfurization experiment is performed by selecting simulated garbage gasification gas, wherein the simulated garbage gasification gas contains 0.2% of COS, 2.4% of $H_2S$ and the balance $H_2O$ and $N_2$. The desulfurization experiment is performed with the COS introduction flow of 0.2 mL/min, the $H_2S$ introduction flow of 2.4 mL/min and carrier gas $H_2O$ and $N_2$ flow of 97.4 mL/min. An experimental result shows that the desulfurization efficiency is 89% at 350° C.

It can be known from Embodiments 1-3 that the MnSnO$_x$/SBA-15 catalyst is optimum in efficiency at 350° C. when the desulfurization experiment is performed by selecting the simulated garbage gasification gas, wherein the simulated garbage gasification gas contains 0.2% of COS, 2.4% of H$_2$S and the balance H$_2$O and N$_2$.

The desulfurization efficiency is also affected by selecting different carriers.

The present disclosure researches influence on desulfurization efficiency of the prepared MnSnO$_x$/SBA-15 catalyst at 350° C.

Embodiment 4

Different from Embodiment 1, the active components of the catalyst are a salt solution of manganese and tin, and the carrier is a mesoporous MCM-41 molecular sieve.

A desulfurization experiment is performed by selecting simulated garbage gasification gas, wherein the simulated garbage gasification gas contains 0.2% of COS, 2.4% of H$_2$S and the balance H$_2$O and N$_2$. The desulfurization experiment is performed with the COS introduction flow of 0.2 mL/min, the H$_2$S introduction flow of 2.4 mL/min and carrier gas H$_2$O and N$_2$ flow of 97.4 mL/min. An experimental result shows that the desulfurization efficiency is 95% at 350° C.

Embodiment 5

Different from Embodiment 1, the active components of the catalyst are a salt solution of manganese and tin, and the carrier is nano porous carbon powder NCP-50.

A desulfurization experiment is performed by selecting simulated garbage gasification gas, wherein the simulated garbage gasification gas contains 0.2% of COS, 2.4% of H$_2$S and the balance H$_2$O and N$_2$. The desulfurization experiment is performed with the COS introduction flow of 0.2 mL/min, the H$_2$S introduction flow of 2.4 mL/min and carrier gas H$_2$O and N$_2$ flow of 97.4 mL/min. An experimental result shows that the desulfurization efficiency is 97% at 350° C.

It can be known from Embodiments 1, 4 and 5 that the catalyst of the disclosure has certain influence on desulfurization as different carriers are used, and the efficiency is also different as the channel structures of the carriers are different. The MCM-41 molecular sieve is low in price. But the channels of the molecular sieve are arranged hexagonally and orderly, and the pore diameters are 2.5-4 nm, so that the active components hardly enter the channels. Even if a part of active components enter the channels, as the molecular sieve is of a one-dimensional channel structure, toxic gas is in contact with the outer surface only if any position of the channels is blocked, such that the catalyst is poor in desulfurization efficiency. As the nano porous carbon powder NCP-50 is of a three-dimensional through nano channel structure, it is more favorable to diffuse substances and load other materials; the pore diameter is adjustable within a range of 10-50 nm, the active components can be limited in the channels and are unlikely to agglomerate, such that the efficiency of the catalyst is improved obviously. But the nano porous carbon powder NCP-50 is high in price and is not suitable for industrial production. Each pore of NCP-50 is connected to 12 peripheral holes, and the channels may have the defect of collapsing easily. Thus, the desulfurization efficiency is also affected by using different halogen atom modified molecular sieves.

Embodiment 6

Different from Embodiment 1, pre-treatment on the SBA-15 molecular sieve with a templating agent unremoved: first, the SBA-15 molecular sieve is dissolved in ethanol to be subjected to reflux, the refluxed SBA-15 molecular sieve is washed and dried, the above operations are repeated twice, then the dried product is dissolved in ethanol and is dispersed ultrasonically, and tert-butyl bromoacetate is dropwise added to introduce halogenated bromine.

Other steps are same, and finally, the MnSnO$_x$/SBA-15 catalyst is prepared.

A desulfurization experiment is performed by selecting simulated garbage gasification gas, wherein the simulated garbage gasification gas contains 0.2% of COS, 2.4% of H$_2$S and the balance H$_2$O and N$_2$. The desulfurization experiment is performed with the COS introduction flow of 0.2 mL/min, the H$_2$S introduction flow of 2.4 mL/min and carrier gas H$_2$O and N$_2$ flow of 97.4 mL/min. An experimental result shows that the desulfurization efficiency is 90% at 350° C.

Embodiment 7

Different from Embodiment 1, pre-treatment on the SBA-15 molecular sieve with a templating agent unremoved: first, the SBA-15 molecular sieve is dissolved in ethanol to be subjected to reflux, the refluxed SBA-15 molecular sieve is washed and dried, the above operations are repeated twice, then the dried product is transferred into a water bath pot at 80° C. to be stirred, and hydroiodic acid is dropwise added to introduce halogenated iodine.

Other steps are same, and finally, the MnSnO$_x$/SBA-15 catalyst is prepared.

A desulfurization experiment is performed by selecting simulated garbage gasification gas, wherein the simulated garbage gasification gas contains 0.2% of COS, 2.4% of H$_2$S and the balance H$_2$O and N$_2$. The desulfurization experiment is performed with the COS introduction flow of 0.2 mL/min, the H$_2$S introduction flow of 2.4 mL/min and carrier gas H$_2$O and N$_2$ flow of 97.4 mL/min. An experimental result shows that the desulfurization efficiency is 84% at 350° C.

It can be known from Embodiments 1, 6 and 7 that the catalyst of the disclosure has certain influence on desulfurization as different modification halogen atoms are used. Si—Cl is smaller than Si—Br and Si—I in bond energy in halogen family elements, such that the active components are more easily combined with the molecular sieve.

Comparative Example 1

Different from Embodiment 1, the step S1 specifically includes the steps: removal of a templating agent for the molecular sieve: the SBA-15 molecular sieve is screened by a mesh sieve, is washed for several times with deionized water, and is evaporated, and finally, the SBA-15 molecular sieve is roasted at 550° C. for about 6 hours under the N$_2$ atmosphere.

Other steps are same, and finally, the MnSnO$_x$/SBA-15 catalyst is prepared.

A desulfurization experiment is performed on the MnSnO$_x$/SBA-15 catalyst prepared in this comparative example, and the desulfurization experiment is performed by selecting simulated garbage gasification gas, wherein the simulated garbage gasification gas contains 0.2% of COS, 2.4% of H$_2$S and the balance H$_2$O and N$_2$. The desulfurization experiment is performed with the COS introduction flow of 0.2 mL/min, the H$_2$S introduction flow of 2.4 mL/min and carrier gas H$_2$O and N$_2$ flow of 97.4 mL/min. An experimental result shows that the desulfurization efficiency is 91% at 350° C.

Comparative Example 2

Different from Embodiment 1,
the step S1 specifically includes the steps: first, the SBA-15 molecular sieve is dissolved in ethanol to be subjected to reflux for 10-14 hours at 60-80° C., the refluxed SBA-15 molecular sieve is washed and dried, the above operations are repeated twice, then, the dried product is dissolved in normal hexane and is treated ultrasonically for 20-30 minutes, and a certain amount of 3-aminopropyltriethoxysilane is dropwise added, and ultrasonic treatment is performed for 30-40 minutes; and finally, the treated material is transferred into a water bath pot at 50-80° C. to be subjected to reflux condensation for 10-14 hours to introduce amino.

Other methods are same, and finally, the MnSnO$_x$/SBA-15 catalyst is prepared.

A desulfurization experiment is performed on the MnSnO$_x$/SBA-15 catalyst prepared in this comparative example, and the desulfurization experiment is performed by selecting simulated garbage gasification gas, wherein the simulated garbage gasification gas contains 0.2% of COS, 2.4% of H$_2$S and the balance H$_2$O and N$_2$. The desulfurization experiment is performed with the COS introduction flow of 0.2 mL/min, the H$_2$S introduction flow of 2.4 mL/min and carrier gas H$_2$O and N$_2$ flow of 97.4 mL/min. An experimental result shows that the desulfurization efficiency is 95% at 350° C.

It can be known from the comparative example 1 and the comparative example 2 that hydroxyl modification and amino modification are performed inside and outside the SBA-15 molecular sieve respectively. Hydroxyl is a hydrophilic group, and interaction between Si—OH and the active components is facilitated due to a hydrophilic behavior of Si—OH, such that the active components are loaded inside and outside the SBA-15, but interaction between the Si—OH and the active components is not as strong as that between the halogen atoms and the active components. Amino can fix atoms by coordinate bonds, and as nitrogen-hydrogen bonds are larger than silicon-chlorine bonds in bond energy, interaction with the active components is weak.

The part not described in the present disclosure can be realized with reference to the prior art.

It should be noted that any equivalent modes or obvious variations made by those skilled in the art shall fall within the scope of protection of the present disclosure under the teaching of the description.

The invention claimed is:

1. A preparation method of a catalyst capable of simultaneously removing COS and H$_2$S in garbage gasification, successively comprising the following steps:
S1, taking a mesoporous molecular sieve SBA-15 as a carrier and pretreating the mesoporous molecular sieve SBA-15:
dissolving the mesoporous molecular sieve SBA-15 in ethanol to be subjected to reflux in a water bath, performing washing and drying, dissolving the dried product in normal hexane, performing ultrasonic dispersion, dropwise adding a modifier to introduce halogen atoms to modify an outer surface of the mesoporous molecular sieve SBA-15, performing ultrasonic dispersion for a period of time, moving the ultrasonically treated mesoporous molecular sieve SBA-15 into a container for refluxing, and performing filtering, washing and drying to obtain the pretreated mesoporous molecular sieve SBA-15;
S2, preparing an active component solution, wherein the active component solution is one of an MnSn solution, a FeSn solution or a ZnSn solution;
S3, uniformly mixing the mesoporous molecular sieve SBA-15 pretreated in the step S1 with the active component solution, putting the mixture in a magnetic stirrer to be stirred at a uniform speed for a period of time, allowing the stirred mixture to stand, and performing drying; and
S4, roasting the solid obtained by drying in the step S3 at a temperature of 450-550° C. for 4-6 hours, then naturally cooling the roasted solid to room temperature after roasting is finished, performing grinding and drying, and performing calcining under a N2 atmosphere to obtain the catalyst;
wherein in the step S1, the mesoporous molecular sieve SBA-15 is dissolved in ethanol, the water bath temperature is set at 60-80° C., the reflux time is 10-13 hours, and a templating agent for the mesoporous molecular sieve SBA-15 is removed by washing and drying; and the mass-volume ratio of the mesoporous molecular sieve SBA-15 to ethanol is 1:20 g/mL; and
wherein in the step S1, the modifier is one of chloromethyltrimethylsilane, tert-butyl bromoacetate or hydroiodic acid, and chlorine atoms are introduced by chloromethyltrimethylsilane, bromine atoms are introduced by tert-butyl bromoacetate and iodine atoms are introduced by hydroiodic acid.

2. The preparation method of the catalyst capable of simultaneously removing COS and H$_2$S in garbage gasification according to claim 1, wherein the modifier is chloromethyltrimethylsilane.

3. The preparation method of the catalyst capable of simultaneously removing COS and H$_2$S in garbage gasification according to claim 2, wherein the active component solution in the step S2 is the MnSn solution.

4. The preparation method of the catalyst capable of simultaneously removing COS and H$_2$S in garbage gasification according to claim 3, wherein the MnSn solution is prepared by the following steps: weighing 2.5 g of a 50% Mn(NO$_3$)$_2$ solution and preparing a 50 mL solution in a beaker; weighing 1.02g of SnCl$_4$·5H$_2$O and preparing a 50 mL solution in a beaker; and uniformly mixing the two solutions well to obtain the MnSn solution.

5. The preparation method of the catalyst capable of simultaneously removing COS and H$_2$S in garbage gasification according to claim 3, wherein in the step S3, the mixture is stirred for 10-14 hours, is allowed to stand for 10-14 hours, and is dried in an oven at a temperature of 70-90° C.

6. The preparation method of the catalyst capable of simultaneously removing COS and H$_2$S in garbage gasification according to claim 3, wherein the calcining temperature is 450-550° C.

7. The preparation method of the catalyst capable of simultaneously removing COS and H$_2$S in garbage gasification according to claim 3, wherein in the step S1, the dried product is dissolved in normal hexane, ultrasonic treatment is performed for 20-30 min, the modifier chloromethyltrimethylsilane are added dropwise, and ultrasonic treatment is continued to be performed for 20-40 min.

8. A catalyst prepared by the preparation method of the catalyst capable of simultaneously removing COS and $H_2S$ in garbage gasification according to claim 3, wherein in the catalyst, manganese and tin account for 5-20 wt % and 5-15 wt % of the mass of the catalyst, respectively.

\* \* \* \* \*